Figure 1:
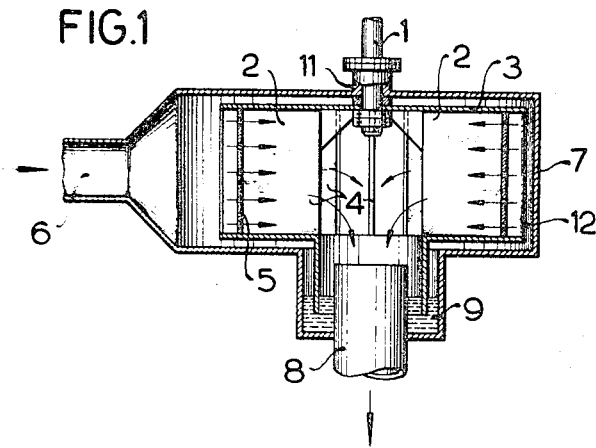

United States Patent

Petersen

[15] 3,653,187
[45] Apr. 4, 1972

[54] APPARATUS FOR AGGLOMERATING AND PRECIPITATING SUSPENDED MATTER OUT OF GASES AND VAPORS AND/OR FOR ABSORBING GAS COMPONENTS

[72] Inventor: Gerd Hugo Petersen, Am Birnbaum 34, Wiesbaden-Sonnenberg, Germany

[22] Filed: May 20, 1970

[21] Appl. No.: 39,097

[30] Foreign Application Priority Data

May 24, 1969 Germany .................... P 19 26 651.4
Feb. 19, 1970 Germany .................... P 20 07 547.2

[52] U.S. Cl. .................... 55/230, 55/236, 55/237, 261/79
[51] Int. Cl. .................... B01d 47/00
[58] Field of Search .................... 55/230, 235, 236, 237, 238; 261/79 A

[56] References Cited

UNITED STATES PATENTS

| | | | |
|---|---|---|---|
| 888,091 | 5/1908 | Kestner | 55/230 U |
| 3,453,808 | 7/1969 | Neuman | 55/230 X |
| 1,408,736 | 3/1922 | Hernu | 55/230 |
| 3,557,535 | 1/1971 | Howick | 55/237 |
| 1,264,263 | 4/1918 | Brassert | 55/236 |

*Primary Examiner*—Howard R. Caine
*Attorney*—McGlew and Toren

[57] ABSTRACT

Rotatable treatment chambers arranged on a drive shaft are bounded by disk-like boundary walls and radial partition walls. The treatment chambers are arranged in a spiral housing with tangential gas inlet and axial gas outlet. The gas to be treated enters the spiral housing tangentially on its outer periphery at a high velocity, it is sucked radially through the treatment chambers, and leaves the housing purified passing through a central gas outlet. Due to the rotation of the treatment chambers by which the gas is set in rotation, a gravity field is produced whose direction is opposite to the direction of flow of the gas. Accordingly, gases and vapors to be purified receive such a high centrifugal acceleration that the suspended particles they contain, due to their centrifugal acceleration, are separated out in the direction against the flow of the gases and vapors. This effect is enhanced by additional injection of fluid. This arrangement can also be used for the absorption of gas components.

19 Claims, 21 Drawing Figures

PATENTED APR 4 1972

3,653,187

SHEET 1 OF 5

INVENTOR

GERD HUGO PETERSEN

By: McGlew & Toren

ATTORNEYS

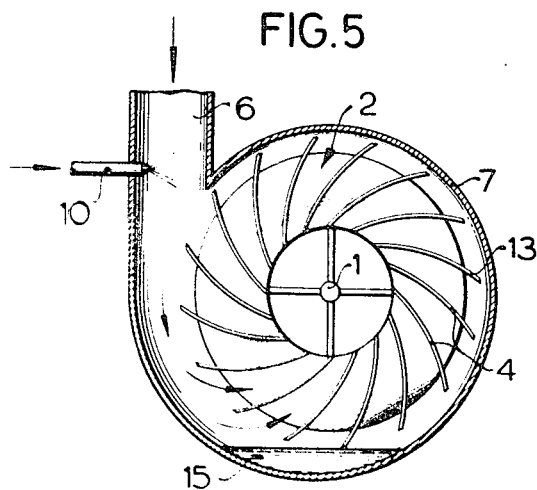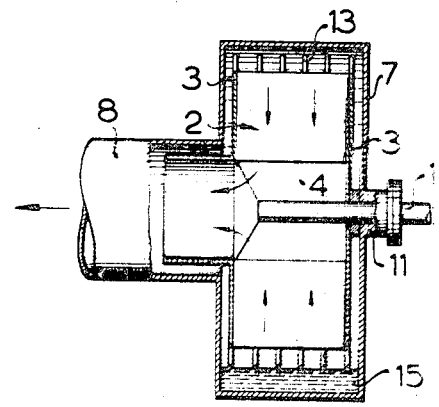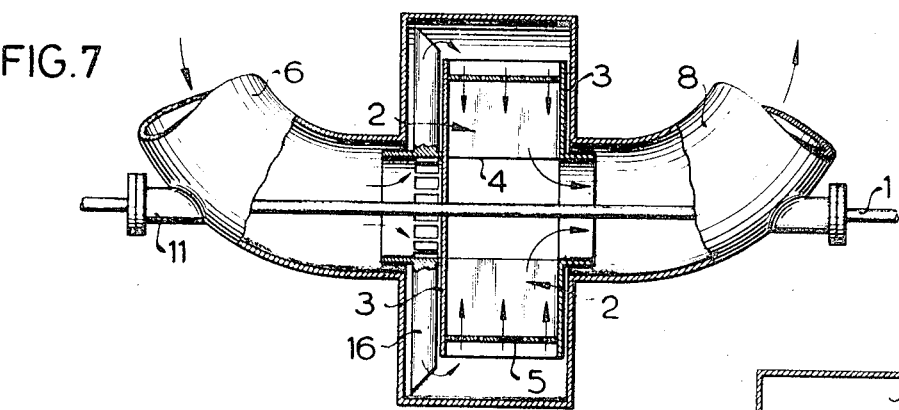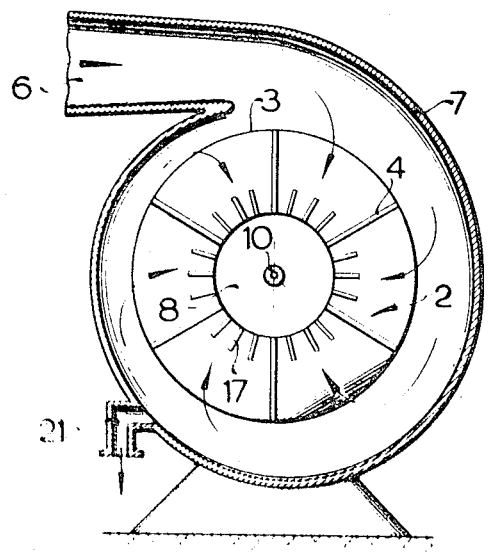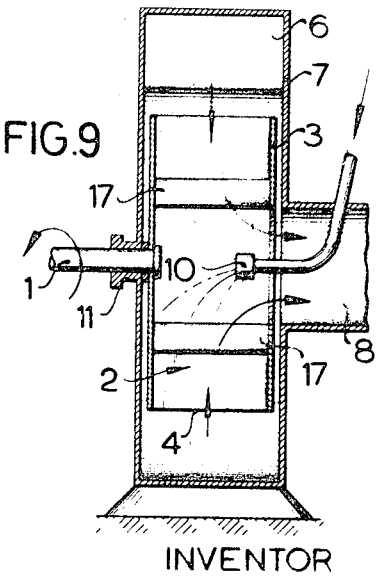

PATENTED APR 4 1972 3,653,187

SHEET 3 OF 5

INVENTOR

GERD HUGO PETERSON

By: McGlew & Toren

ATTORNEYS 3,653,187

APPARATUS FOR AGGLOMERATING AND PRECIPITATING SUSPENDED MATTER OUT OF GASES AND VAPORS AND/OR FOR ABSORBING GAS COMPONENTS

SUMMARY OF THE INVENTION

The invention relates to a method and an apparatus for agglomerating and precipitating suspended matter out of gases and vapors and/or absorbing gas components in a wet process, using centrifugal acceleration in treatment chambers which rotate about a shaft and which have radial partition walls, wherein the gases to be treated are passed radially inwardly in the opposite direction to the effect of the field of gravity.

Methods and apparatus for cleaning gases are known in which the suspended matter is thrown out of suspension in the gases and vapors in a rotary machine by closely packed filter particles or by vanes. In some cases, the gases are cleaned for example by spraying in a washing liquid. The cleaning action due to the liquid to be injected can be achieved by the liquid being atomized under high pressure in the gas by means of nozzles or other devices. In accordance with other proposals, the liquid may also be atomized by rotating the spray distributor. A similar effect is also achieved by passing the gas at high speed past the point of injection of the liquid. In other wet cleaning apparatuses, the gas is directed on to the surface of a bath of liquid at such a high speed that the washing liquid is carried off and atomized.

Methods and apparatuses for cleaning gases are known in which the suspended matter is thrown out of the gases and vapors in a rotary machine either by closely packed filter particles or by vanes. In one of the known apparatuses, suspended matter such as dust, mist and the like are to be separated from gases. This apparatus uses nozzle-like narrowed passages through which the gas is passed at high speed and in which the direction of the gas is changed. The passages are formed by nozzle bars which extend with their longitudinal direction parallel to the axis of a rotating cylinder. Secured to this axis or shaft is a disc and spaced therefrom, a ring. The nozzles bars are arranged between these members. They are combined in a side-by-side arrangement to form a rotary horizontal cylinder casing. The cylinder is rotatably arranged in a housing which has an inlet arranged perpendicularly to the direction of the shaft, and an outlet which extends parallel to the shaft. The above mentioned passages are in the form venturi-like of intermediate spaces between each two nozzle bars. In its main portion the passage has a particularly narrow cross-section by means of which the gases and vapors are deflected.

Another known apparatus uses a spiral-shaped blower housing. This is a dust-arrester which comprises a blower with blower housing and water delivery nozzles opening into the housing. The gas to be cleaned is sucked in axially, passed into and moved by the rotor, turned radially outwardly along the walls of the spiral-shaped blower housing, and discharged. As the gas passes long the outside walls of the blower housing, liquid is sprayed on to the peripheral surface. In this apparatus, the field of gravity which is necessarily produced is not generated intentionally. The gases passes in the direction of the field of gravity produced by rotation of the rotor.

Another known apparatus is used to clean air and other gases. The gases are introduced axially, that is to say, parallel to the rotor shaft, are turned through 180°, and issue in the opposite direction, namely also parallel to the rotor shaft. The effect of a field of gravity is neither recognized nor utilized.

In all the above described known apparatuses and methods, in spite of widely varying configurations of the vanes, the arrangement of the filter particles, increasing the speeds of rotation of the machines and varying other technical parameters, no one has yet succeeded in increasing the efficiency of the apparatus beyond a certain degree.

The disadvantage of the known wet cleaning apparatuses lies in their low cleaning effect when used on fine suspended particles. Also, the degree of mechanical efficiency, which results from the power consumption for moving the gases and liquid, is excessively low in comparison with the cleaning efficiency.

The invention is based on the problem of providing a method and an apparatus for separating mists and dusts from gases and vapors, in which the degree of cleaning efficiency is to be increased using simple means.

In accordance with the invention, this problem is solved in that such a high centrifugal acceleration is imparted to the gases or vapors by high-speed rotation that in the field of gravity generated, the particles of suspended matter move in the direction of the field of gravity against the gas flow. In accordance with the present method, the washing action is to be attributed to vigorous agglomeration of the particles of mist and dust, with each other or with the liquid which is additionally atomized. In fact, as soon as the gases to be cleaned are brought into a strong field of gravity, even the finest particles no longer remain suspended in the gas, but move in the direction of the field of gravity at different speeds, depending on their sizes. The high, different speeds of the individual particles then result in agglomeration and precipitation of the impurities.

It is known that the finest mist particles are on average $1\mu$ in diameter. In the literature, water droplets which are $10\mu$ in diameter are denoted as a coarse mist. The inventor was the first to have the idea that the particles to be separated could be removed from the uncleaned gases or the mist by the effect of a field of gravity. The inventor does not follow the conventional path of throwing the particles to be removed out of the gases. He rather sought the reasons why it is not possible to use the previously known apparatuses to separate very fine dust or mist out of a gas, and arrived at the subject of the invention in the course of his deliberations.

The smaller the diameter of a liquid or solid particle, the lower also is its speed of fall. While normal free fall of a body in the field of gravity of the earth is at a continuously increasing speed, in the case of smaller particles, they very soon reach a uniform speed of fall or speed of float. This speed is governed by the friction of the particles in the air. It is known from the literature that the speeds of fall or float of drops of water which are $1\mu$ in diameter are 0.027 mm. per second; that is, about 0.1 m. per hour; and of drops of water which are $10\mu$ in diameter, 2.7 mm. per second, that is, about 10 m. per hour. Water droplets which are less than $10\mu$ in diameter can in practice hardly be removed from a gas by sedimentation in the field of gravity of the earth. The inventor concluded from that fact that the above mentioned low speeds of fall are the cause of the difficulty in separating extremely fine dust or mist from a gas. The particles follow virtually any very slight movement of the gas.

Agglomeration of the particles of different diameters, by means of the difference in speeds of float, is also scarcely possible as the differences in the various speeds are too small. Thus the inventor arrived at the idea of increasing the speeds of fall or float of the particles by a multiple. Instead of the field of gravity of the earth, the inventor therefore uses a field of gravity which is about 100 times greater. The specific weight of the particles is then also 100 times greater, and the speeds of float are also 100 times as great as the above mentioned speeds. The strong field of gravity in accordance with the invention is produced by centrifugal acceleration. In the apparatus which is described in greater detail hereinbelow, the following values, given by way of example, are found: with a radius of 0.2 m. and a rotary speed of 3,000 r.p.m., the peripheral speed is 62.8 m. per second and thus the centrifugal acceleration is about 20,000 m. per second$^2$. This is approximately equal to 2,000 times the acceleration due to the earth.

With a larger radius of for example 0.4 m. the speeds of rotation can be less to achieve the same centrifugal acceleration.

In accordance with the invention, it is particularly desirable for the gases to be treated, before passing into the rotating treatment chambers, to be brought to the same peripheral speed as the treatment chambers in the spiral housing surrounding the chambers, by means of a high gas inlet speed and/or by entrainment vanes. This advantageously prevents premature separation of individual particles. As soon as the shaft with the treatment chambers is set in rotation, the gas to be treated is exposed in the chambers to the desired acceleration effect. The magnitude of the field of gravity is determined by the peripheral speed and the size of the treatment chambers.

The gases to be cleaned are passed through the rotating treatment chambers and participate in the rotary movement, owing to the partition walls provided. The gases are passed radially inwardly. The speed at which the gases pass radially through the treatment chambers is selected in accordance with the desired time of residence in the field of gravity. In order to achieve as good a cleaning action as possible, the radial speed in the treatment chambers should not be much greater than 15 m. per second. It is of advantage to use a speed of from 2 to 8 m. per second. By increasing the number of suspended particles present in the gas, by injecting an additional liquid, the cleaning effect which is primarily based on agglomeration and immediate precipitation of the coarsened suspended particles, is further improved. Care should be taken that the rotating treatment chambers, particularly the partitioning thereof, do not cause premature precipitation of the additionally atomized liquid. It has therefore been found to be of advantage for the gases to be brought up to the same peripheral speed as the rotating treatment chambers, as mentioned above, by the gases passing into the spiral housing surrounding the treatment chambers at a high inlet speed.

In the apparatus for carrying out the above described method, it has been found particularly desirable for the radial partition walls of the individual treatment chambers to be inclined or curved forwardly in the direction of rotation. As a result, the increased initial peripheral speed of the gases flowing towards the center is not retarded by the partition walls.

In order to prevent partial agglomeration of the atomized liquid when it passes into the treatment chambers, because of the rapid rotation, in accordance with the invention it has further been found particularly advantageous for cylindrical, concentric perforated or sieve plates or wire nets to be provided at the outer periphery of the rotating treatment chambers. This causes additional liquid mist to be produced. The treatment of the gases for the purposes of precipitating the extremely fine suspended particles in principle corresponds in this case to the mode of operation of sieve or separating bottom plates in which, when the gases pass through the sieve plates, the liquid is continuously entrained upwardly and finely atomized in the gas by the high speed thereof.

In accordance with the present method, this operation is now effected in the rotating treatment chambers, thus under the action of a field of gravity which is many times greater than that of the earth. Due to this vigorous acceleration, the finest droplets of liquid which are produced by the atomization action no longer float along with the gas but are centrifuged back on to the sieve bottom plate as a result of this acceleration. Owing to the high speed of the finest particles of liquid, all the suspended particles in the gas in the form of impurities are caused to coagulate and precipitate.

In a further advantageous embodiment of the invention, the treatment chambers are disposed around a rotating, horizontally or vertically mounted shaft, and are provided on their outer periphery with entrainment vanes, and the treatment chambers are surrounded by a spiral housing for the outer tangential gas inlet, and nozzles are provided for the injection of additional liquid. The advantage of the apparatus according to the invention is that acceptable precipitation, even of the finest particles of dust and mist, can be achieved. This effect is further increased by the additional spraying of the washing liquid into the gases to be cleaned.

Another preferred embodiment of the invention is characterized in that the direction of rotation of the treatment chambers is opposed to the direction of the gases which enter tangentially at high speed into the spiral housing. In this way, the liquid is advantageously mechanically atomized. If in fact, as specified above, the shaft with the treatment chambers is rotated in the spiral housing in the opposite direction to the direction of rotation of the gases which enter at high flow speed, the precipitated liquid is very finely divided and atomized mechanically at the edge of the entrainment vanes and in this case, like the very fine suspended particles, can be introduced with the gas into the treatment chambers and there increases the coagulation and precipitation of the suspended particles which were primarily present in the gas.

In accordance with the invention, it is also of particular advantage to provide spray nozzles located in the treatment chambers and rotating therewith. In this case too the very fine droplets of liquid do not float along with the gas but are flung by the strong field of gravity radially outwardly in the opposite direction to the gas. By increasing as desired the field of gravity, by suitable selection of the peripheral speed, up to values which are 100 times the field of gravity of the earth, even the very fine droplets in the treatment chambers, which are 100 times their normal weight, fall through the gas and result in precipitation and coagulation of the very suspended particles.

In order effectively to achieve atomization of the additional liquid to be injected, in the apparatus according to the invention with a horizontally mounted shaft entrainment fingers can be mounted at the outer edge of the treatment chambers. The liquid is piled up in the lower portion of the spiral housing so that the fingers of the rapidly rotating treatment chambers dip into the piled-up liquid and cause it mechanically to form a fine mist.

In accordance with the construction of the apparatus for carrying out the method according to the invention, depending on the particular magnitude of the field of gravity and the amount and type of liquid injection selected, there is a certain pressure loss in the gases as they pass through the apparatus. This pressure loss is from 50 to 400 mm. water-column head. The power required to overcome the gas delivery is very much lower in the method according to the invention, in comparison with other systems of equal output.

The delivery of gas through the apparatus is effected by a blower which is connected upstream or downstream of the apparatus. This blower may also readily be combined with the present apparatus insofar as the fan wheel necessary to convey the gas is mounted on the same shaft as the treatment chambers, and provides the necessary conveyance of gas, overcoming the gas resistance of the apparatus. In this case too in which the blower is combined with the apparatus for precipitating the suspended matter, the fan wheel can be arranged upstream or downstream of the treatment apparatus, considered from the gas side.

The present method may also be used with great success for the absorption of gases. The absorption liquid in this case is to be sprayed into the gas. Upon precipitation of the liquid mist, rapid and extensive absorption then occurs.

For the purposes of further increasing its efficiency, the above described apparatus can also be improved in that the treatment chambers have at the central gas outlet short vanes, the length of which is preferably from 10 to 40 percent of the length of the radial partition walls, and that one or more stationary nozzles for spraying in the liquid are arranged in the central gas outlet. The separation effect is thereby substantially improved. Separation of the larger droplets at the higher speeds of rotation is reduced by reducing the number of radial partition walls. For example the number is reduced from 2 to 6 partition walls.

In accordance with the invention, it is also particularly advantageous if the short vanes at the central gas outlet for the distribution of the liquid are only about 10 to 60 mm. in length in the radial direction, and the distance between adjacent vanes is equal to or less than their length. This has a particular effect in large units in which in part it is not convenient to use vanes of which the length is from 10 to 40 percent of the length of the radial partition walls. If both the above conditions are fulfilled, the result is also a further improvement in the efficiency of the machine.

It has also been found of advantage for the partition walls not to extend fully as far as the outer periphery of the lateral boundary discs delimiting the treatment chambers. This provides that, even at elevated speeds of rotation of the chambers, the gases can be brought almost up to the high peripheral speed of the radial partition walls.

A further substantial improvement in the method is achieved by the additional increased spraying of a liquid. An essential feature however is that the additional liquid mist should be brought up to the high peripheral speed of the treatment chambers. Spraying the additional liquid from the central gas outlet advantageously results in success, although it is known that with stationary spray nozzles, it is hardly possible to avoid the liquid being flung out of suspension.

Figure 17:
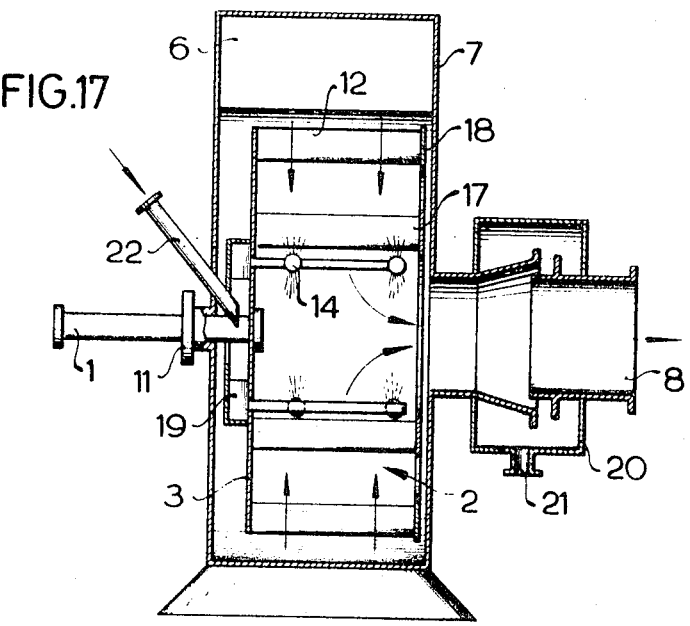
Figure 18:
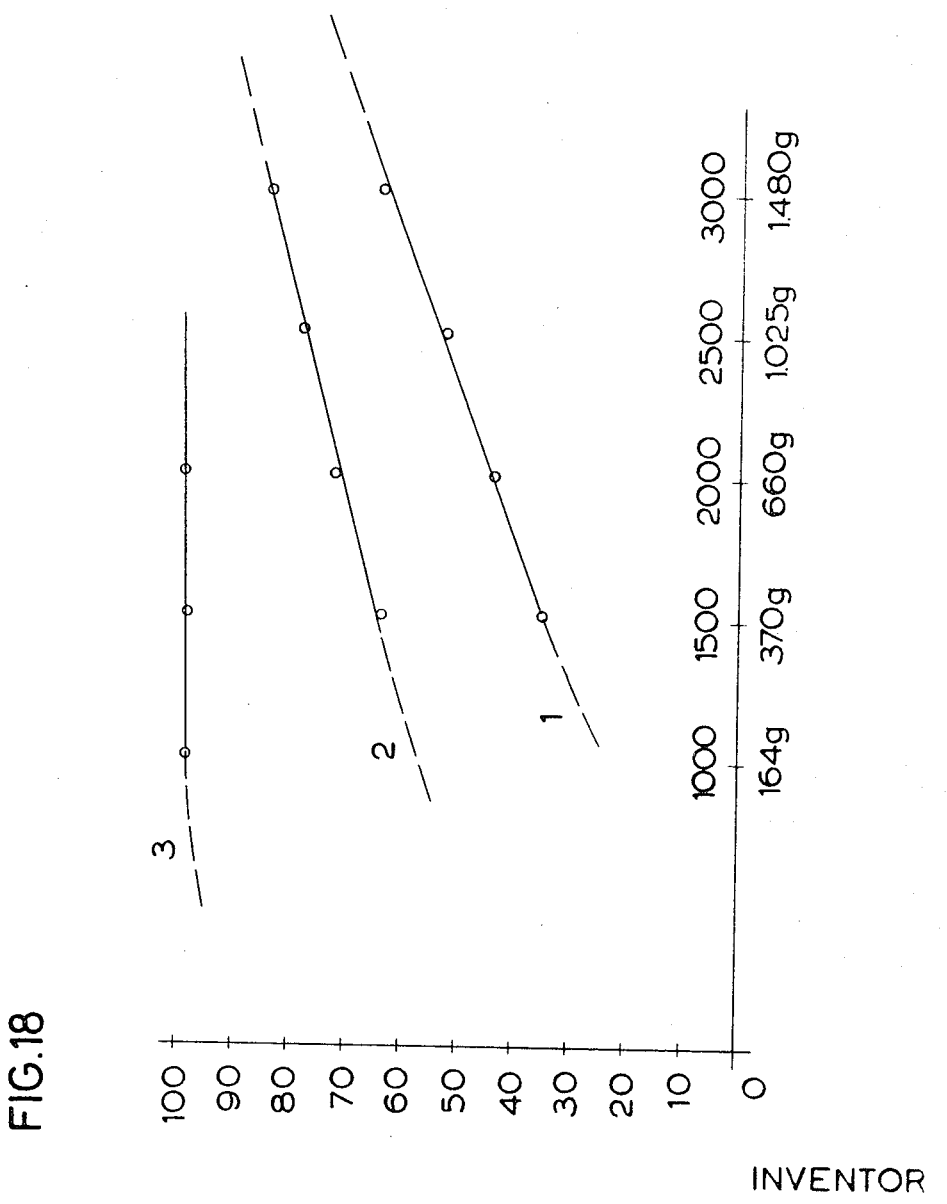

The proposed vanes fling the liquid injected through the stationary nozzles out again. However they entrain the liquid and accelerate it to the peripheral speed of the treatment chambers. It is accelerated radially outwardly by the high peripheral speed and passes in the form of a very fine mist into the rotating treatment chambers, at the same peripheral speed. They can also be called liquid acceleration vanes.

Owing to the high peripheral speed of the treatment chambers, the sprayed liquid is finely atomized on the short vanes, and at high speeds of rotation and with the vanes inclined at a certain angle, the inwardly sucked gas to be cleaned can cause the liquid to be sucked out with the gas flow, so that that liquid is not really effective. This phenomenon of the liquid being entrained through the central gas outlet can very easily be prevented in accordance with the invention in that the short vanes for liquid distribution are displaced outwardly, relative to the diameter of the gas outlet, by from 10 to 50 mm. Due to the strong circulation of gas also present in the gas outlet pipe, any injected liquid is then not immediately entrained into the gas outlet, but is again flung outwardly by the centrifugal force and cannot pass into the gas outlet pipe.

In an advantageous development of the machine, short vanes of which the length is from about 10 to 40 percent of the length of the radial partition walls are additionally disposed at the outer periphery of the treatment chambers. The vanes can also be straight or curved and/or can be arranged radially or inclined forwardly or rearwardly in the direction of rotation. If the reduction in the number of radial partition walls causes the rotor-like treatment chambers to begin to run unevenly, this disadvantageous effect is overcome by the above proposal. The gases to be cleaned are now caused to flow uniformly into the treatment chambers. In accordance with the invention, it is of particular advantage if the short vanes at the outer periphery of the treatment chambers are of a length in the radial direction of from about 10 to 60 mm. only, and if the distance between adjacent vanes is equal to or less than their length.

Another advantageous embodiment of the invention provides that the radial partition walls are of a length of about 30 to 60 percent of the radial dimension of the chambers so that from the outer periphery of the treatment chambers, they only extend into the middle portion thereof. This step provides for a further improvement in the separation action. The cause of this phenomenon is assumed to be that the omission of part of the partition walls causes even less of the large mist particles present to be flung out, so that they contribute to agglomeration with the fine mist particles which are to be separated.

For higher speeds, it has been found particularly desirable if in accordance with the invention the treatment chambers only comprise the two lateral disc-like boundary walls and the inner and outer short vanes, with the radial partition walls being omitted. The improvement in the efficiency of the machine was surprising. As a result of the last mentioned steps, the gases to be cleaned are brought up to the peripheral speed by the outer vanes. As they pass to the center of the treatment chambers, they retain their peripheral speed, and, similarly as in a whirlwind, are brought up to higher speeds of rotation as the diameter is constantly reduced while the peripheral speed remains the same.

In accordance with the invention, it is particularly advantageous for the inner and outer short vanes to be staggered relative to each other. In this way, the liquid which is flung out by the inner vanes can fly through the antechamber formed by two outer vanes.

An advantageous development of the invention provides that the treatment chambers only comprise the two lateral disc-like boundary walls and the outer entrainment vanes for accelerating the gases to the peripheral speed of the treatment chambers, and for liquid distribution devices to be arranged in the central gas outlet. At higher speeds of rotation of the treatment chambers and higher rates of gas flow through the chambers, high speeds of rotation of the gases occur at the gas outlet such that the above mentioned features of the invention provide a further improvement in the efficiency of the machine. In this case, by using fine liquid nozzles, it is possible to cause the liquid to be accelerated to the high peripheral speed by the gases themselves. Although the gases flow inwardly to the central gas outlet, the liquid droplets produced flow outwardly through the treatment chambers, owing to the high centrifugal force.

The disc-like boundary wall on both sides of the treatment chambers serves to achieve a sturdy construction for the treatment chambers. In the case of machine units which are not too large however, in accordance with the invention it is of particular advantage for the short vanes at the outer and inner peripheries of the treatment chambers to be disposed on the side of the gas outlet on concentric rings and on the opposite side, on the disc-like boundary wall of the treatment chambers. The disc-like boundary wall on the gas outlet side is then advantageously replaced by concentric rings which hold the short vanes at the inner and outer diameters of the treatment chambers. In the event that only the outer vanes are used, a single outer ring would suffice.

A further advantageous embodiment of the invention provides that the treatment chambers are filled with nets or mats made of wires or cords of less than 3 mm. thick.

It is of particular advantage in the apparatus according to the invention if a rotating liquid fan wheel is arranged at the end of the drive shaft, which is in communication with nozzles which also rotate with the treatment chamber. This enables a particularly advantageous spraying of the liquid to be achieved. A relatively high liquid pressure for the nozzles is produced by the high speed of rotation.

Under certain conditions, it happens that liquid drops are carried out with the cleaned gas through the central gas outlet. This liquid can be very easily separated from the gas by connecting directly to the central gas outlet a per se known liquid cyclone centrifuge. The gases are still moving at a very high peripheral speed in the gas outlet pipe so that this pipe acts like a cyclone centrifuge and liquid droplets present immediately pass to the wall of the pipe and from there can be discharged through a liquid trap.

The short vanes can also be straight or curved and can be arranged radially or at an angle forwardly or rearwardly in the direction of rotation. The radial partition walls can be straight or can be curved or inclined forwardly in the direction of rotation. Depending on the particular design of the machine, this can further improve its efficiency.

Further advantages, features and possible uses of the present invention will be apparent from the following description, together with the drawings in which:

FIG. 1 shows a diagrammatic section through an apparatus according to the invention, FIG. 2 shows a plan view with the treatment chambers arranged around a shaft, FIG. 3 shows another embodiment of the invention, FIG. 4 shows a diagrammatic section through a further embodiment of the apparatus according to the invention, FIG. 5 shows a section through a treatment chamber with radially curved partition walls, FIG. 6 shows a section through the apparatus according to the invention with a horizontal shaft, FIG. 7 shows a section through the apparatus according to the invention with a fan wheel mounted on the shaft for gas conveyance, FIG. 8 shows a diagrammatic longitudinal section through a further improved apparatus according to the invention, FIG. 9 shows a diagrammatic cross section with central gas outlet, FIGS. 10 to 16 show sections of different embodiments of the treatment chambers, FIG. 17 shows a cross section through a further embodiment of the apparatus with treatment chamber and cyclone centrifuge at the gas outlet, and FIG. 18 shows a graph in which the separation in dependence on the speed of rotation of a test apparatus is shown for three different dusts or mists.

The apparatus shown in section in FIG. 1 comprises the drive shaft 1 on which are mounted the centrally arranged treatment chambers 2. These chambers are delimited by the disc-like boundary walls 3 and the radial partition walls 4. At the outer edge of the treatment chambers 2 are perforated or slotted plates 5 arranged in a circle.

The drive shaft 1 is driven in rotation by an electric motor and drives the treatment chambers 2. The apparatus is in a spiral housing 7 with the tangential gas inlet 6 and the axial gas outlet 7. So that the gas cannot evade the chambers without treatment, an immersed closure means 9 provides for sealing. The apparatus is gas-tight closed outwardly to the drive shaft by a gland 11.

The gases to be treated pass tangentially at its outer periphery into the spiral housing 7 at high speed, are then sucked radially through the treatment chambers 2, and leave the apparatus in a cleaned condition through the central gas outlet 8. The perforated or slotted plates 5 through which the gases flow at high speed provide for normal atomization of the precipitated liquid. While the cleaned gases leave the treatment chambers 2 in the opposite direction to the direction of the field of gravity, the entrained suspended particles and also the additional liquid droplets travel in the opposite direction to the gas flow and are separated outwardly. Due to the varying speeds of the individual particles, vigorous agglomeration and coarsening of the very fine mist particles occurs in these treatment chambers, which then lastly lead to the separation of the coarser drops.

Figure 2:
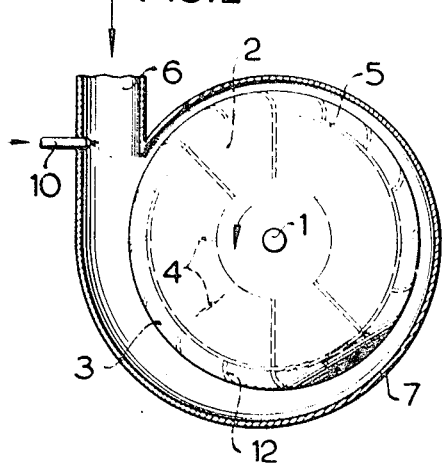
Figure 3:
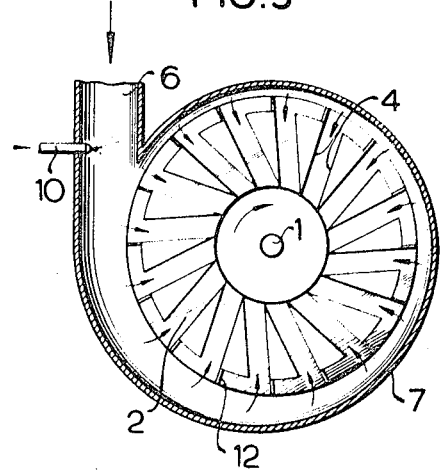

FIGS. 2 and 3 show plan view of different embodiments of the treatment chambers 2 arranged around the shaft. In the embodiment shown in FIG. 2, the gas to be cleaned flows at high speed at a tangent into the spiral housing 7 through the gas inlet pipe 6 and is additionally sprayed with a liquid by the injection device 10. Owing to the high speed of gas inlet and the entrainment vanes 12 at the outer edge of the treatment chambers which rotate in the same direction, the gas is brought up to the same peripheral speed as the treatment chambers. There is no centrifuging out of the injected liquid as it enters. It can therefore be fully used to treat the gases in the field of gravity, for the purposes of agglomerating the suspended particles in the gas.

FIG. 3 shows a further embodiment of the method. In this case the direction of rotation of the treatment chambers 2 is opposed to the tangential intake of gas. The entrainment vanes or blades 12 provided at the outer periphery of the treatment chambers cause the liquid injected through the nozzles 10 to be broken up into a very fine mist, so that the liquid can pass into the treatment chambers 2 with the gas, without being precipitated by the partition walls of the treatment chambers.

In this case the treatment chambers are provided with parallel partition walls 4. These walls do not point to the center line of the drive shaft but are inclined forwardly in the direction of rotation. This step prevents any retardation, owing to the increased peripheral speed of the gases at the intake into the treatment chambers relative to the discharge therefrom. The higher peripheral speed at the inlet into the treatment chambers is therefore for the major part maintained in the radial flow of gas towards the center.

Figure 4:
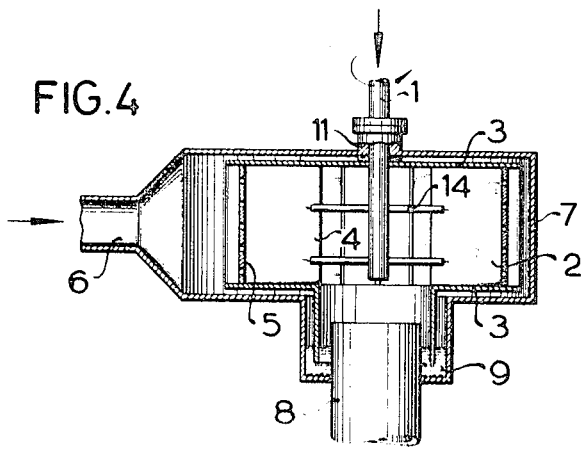

FIG. 4 shows a section through a further embodiment of the separator. In this device the liquid is injected by injection devices 14 disposed in the treatment chambers 2 and rotating therewith. The liquid to be injected is supplied through the drive shaft which is hollow in this case, and passes through corresponding pipes into the treatment chambers where it is then atomized by nozzles under pressure. This injection provides that the liquid already participates in the rotation of the treatment chambers and thus, when the gases pass thereinto, cannot be deflected by the walls of the treatment chambers, thus being lost for agglomeration of the suspended particles.

FIGS. 5 and 6 show sections of a further embodiment of the method. The treatment chambers 2 are set in rotation by the horizontally mounted drive shaft 1. The treatment chambers have radial partition walls 4 which are curved forwardly in the direction of rotation. The gas is introduced into the spiral housing 7 through the tangential gas inlet 6, passes through the treatment chambers 2 which rotate in the same direction, and leaves them in a cleaned condition through the gas outlet 8. Disposed at the outer end of the treatment chambers are entrainment fingers 13 which dip into the pool 15 of liquid which has accumulated in the lower portion of the housing 7, and thus cause mechanical spraying of the liquid.

In all these cases, a blower is to be arranged upstream or downstream of the apparatus in order to overcome the gas resistance thereof. It is also readily possible however, as shown in FIG. 7, to combine the blower, that is to say the gas conveyor means, with the cleaning apparatus. Simultaneously secured to the shaft 1 which rotates the treatment chambers 2 is the blower fan wheel 16. The gases are sucked in centrally through the gas inlet 6 and displaced through the treatment chambers 2 by means of the fan wheel 16. They leave the apparatus on the other side centrally through the gas outlet 8.

The combination of fan wheel and treatment chamber may also be achieved in that the gases first pass into the treatment chambers and are only then sucked on and conveyed by the fan wheel.

When used for treating smaller amounts of gas, the apparatus can be simplified by omitting the disc-like boundary wall of the treatment chambers on the gas outlet side. The treatment chambers in that case are therefore delimited by the disc-like boundary wall 3 on the drive side, the radial partition walls 4 and the stationary wall of the housing on the gas outlet side. For larger apparatuses however, excessively high mechanical forces are generated with this design, which would lead to failure of the rotating treatment chambers.

The apparatus shown in section in FIG. 8 again comprises the drive shaft 1 (see also FIG. 17), on which the rotor-like treatment chambers are centrally secured. At the inner part of the treatment chambers are located short liquid vanes 17 which provide for acceleration of the injected liquid to the peripheral speed of the rotating treatment chambers.

The gases again pass at high speed through the tangential gas inlet 6 into the spiral housing 7, pass radially inwardly through the treatment chambers 2 and leave the chambers through the central gas outlet 8.

The discharge of gases from the treatment chambers 2 and also the injection of the liquid are better apparent in FIG. 9 which shows a cross section through this apparatus. Because of its high speed of rotation, the gas which flows inwardly through the chambers 2 is subjected to the high centrifugal acceleration so that agglomeration and separation of the mist and dust occurs, under the effect of the finely atomized additional liquid introduced through the nozzle 10. They leave the housing through the liquid pipe 21.

Figure 10:
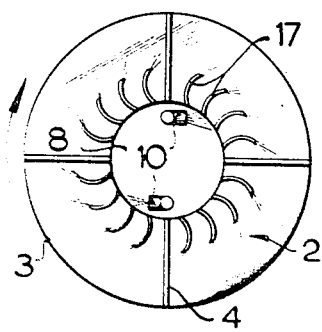
Figure 11A:
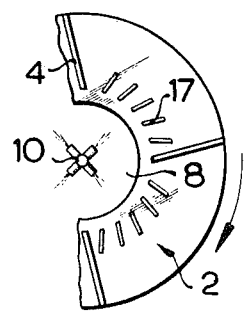
Figure 11B:
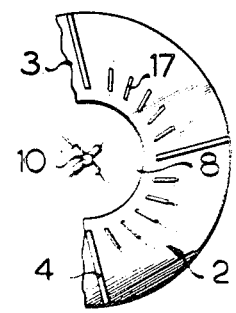
Figure 11C:
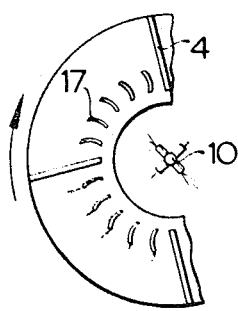
Figure 11D:
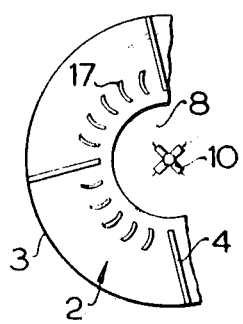

FIG. 10 shows the rotor-like treatment chamber alone, without the surrounding housing. In this case it comprises four treatment chambers 2 which are formed by the disc-like lateral boundary walls and the four partition walls 4. Disposed at the round central gas outlet 8 are two stationary nozzles 10. The injected liquid is concentrated by the short vanes 17 and flung outwardly at high speed by the centrifugal force. The liquid is again atomized at the outer edge of the short vanes 17 after it has reached the same speed as the treatment chambers by means of the vanes.

As shown in FIG. 10, straight vanes can be used, which are inclined rearwardly or forwardly in the direction of rotation. The vanes can however also be curved forwardly or rearwardly. A different embodiment is shown in each quadrant.

In order to prevent drops of liquid being entrained into the gas outlet when the rotor is turning at high speeds, as shown diagrammatically in FIG. 11 the vanes 17 may not be attached directly to the periphery of the gas outlet 8, but can advantageously be displaced radially outwardly by from 10 to 50 mm.

Figure 12:
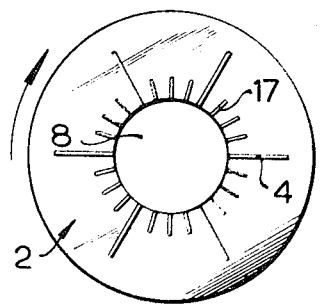
Figure 13:
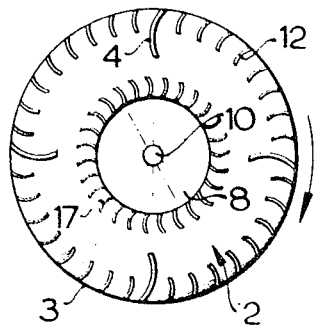
Figure 14:
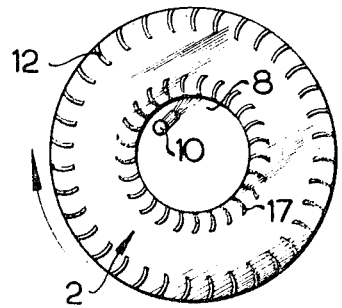
Figure 15:
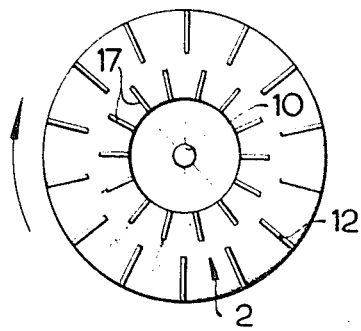
Figure 16:
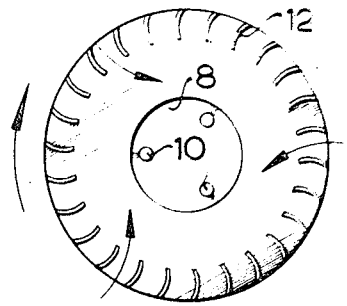

In FIG. 12, the partition walls 4 are not extended to the outer periphery of the rotor. This construction provides that the speed of the incoming gases is further increased before they pass into the treatment chambers 2. This prevents the particles of mist or dust being thrown out by the partition walls. In this embodiment, additional liquid can be injected into the gas inlet and also into the gas outlet.

FIGS. 13 and 14 show two further embodiments of the invention. In FIG. 13, the partition walls 4 are shortened. They extend from the outer periphery of the treatment chambers 2 to the middle thereof. In FIG. 14, the partition walls 4 are completely omitted. In both embodiments, short entrainment vanes 12 are provided at the outer periphery of the treatment chambers 2, which provide that the flow of gas through the treatment chambers 2 is uniform and without excessive turbulence.

FIG. 15 shows a diagrammatic section through a treatment chamber 2 which only comprises the disc-shaped boundary walls 3, the outer vanes 12 for the gases and the liquid acceleration vanes 17 in the inner part of the chamber. This figure shows that it is of advantage for the outer and inner vanes to be staggered so that the liquid atomized by the inner vanes sprays into the free space between the outer vanes.

FIG. 16 shows a further embodiment of the idea according to the invention. In this case, the treatment chamber only comprises the lateral disc-shaped boundary walls 3 and the outer vanes 12 for the gas. The liquid is injected by the gas outlet through stationary nozzles 10. This embodiment has proven to be advantageous at high speeds of rotation. The gases are accelerated to a high peripheral speed by the outer vanes 12 and as they are sucked rapidly inwardly, their speed of rotation is increased, as shown by the arrows. The gases issuing through the gas outlet 8 rotate in this case at a very high speed which is sufficient to break up the injection liquid into a very fine mist and to accelerate it directly to the high peripheral speed. This embodiment may advantageously be used for high peripheral speeds of the rotor and with a rapid and high gas through-put.

FIG. 17 shows a cross section through the apparatus, showing that instead of a disc-like boundary wall 3, concentric rings 18 for securing and supporting the vanes 12 at the outer edge of the treatment chambers and vanes 17 at the inner edge of the treatment chambers can be provided on the gas outlet side. This figure also shows a liquid cyclone centrifuge 20 at the gas outlet 8.

FIG. 18 shows a graph in which separation in dependence on the speed of rotation of a test device is indicated for three different mists or dusts. The levels of centrifugal acceleration are also indicated parallel to the speed of rotation. The three curves mean:

Curve 1 is the degree of separation of ammonium chloride mists in dependence on the speed of rotation or the field of gravity. The ammonium chloride mist is produced by bringing gaseous hydrochloric acid and $NH_3$ gas together. Operation was with a constant concentration of crude gas of 1.2 g $NH_4Cl$ per cbm. The particle size of ammonium chloride is from 0.1 to 2.0$\mu$.

Curve 2 shows the degree of separation of sulphuric acid mists in dependence on the speed of rotation or the field of gravity. On average, the concentration of crude gas used was 0.16 g $H_2SO_4$ per cbm. The sulphuric acid mist was produced by evaporating sulphuric acid. In this case the size of the suspended particles is assumed as being from 1 to 8$\mu$.

Curve 3 shows the dependence of the degree of separation of particles of coloring agents. The concentration of coloring agent in the crude gas was 0.4 g per cbm. The particle size with the coloring agent used is from 5 to 10$\mu$.

In all cases, a constant additional water spray of about 1.2 l/cbm was used.

These curves clearly show that the degree of separation rises with increasing field of gravity. Now the rise differs with the different mists and dusts. This is related to the spectrum of the grain size of these mists. The finer and more uniform the grain size of the particle, the more dependent is the degree of separation on the strength of the field of gravity.

It is apparent from the tests that the invention can be correctly used at any time and that it is also possible to separate out extremely fine droplets. The universal applicability of the idea according to the invention and the advantageous effect and also the reproducibility thereof is clear from the fact that similar tests to those described in the attached graph can be carried out at any time.

I claim:

1. Apparatus for agglomerating and precipitating suspended matter out of gases and vapours and also for absorbing gas components in a wet process, comprising a housing having a pair of side walls joined by a curved wall providing a curvilinear periphery for said housing, a rotatable shaft extending into said housing through at least one of said side walls and being positioned centrally of said curved wall, an inlet connected to said housing for supplying gas into said housing at its curvilinear periphery, an outlet connected to said housing and disposed substantially concentrically about the axis of said shaft for removing gas centrally from said housing, and means positioned within said housing and secured to said shaft for rotation with said shaft, said means forming radially extending treatment chambers open at the radially outer and inner ends thereof, and closed at least partially on the lateral sides of the treatment chambers between the radially outer and inner ends, whereby said shaft is rotated at a higher rate of speed and the gas is supplied so that it flows radially inwardly from said inlet through the treatment chambers to said outlet flowing counter to the field of gravity generated by the rotation of said shaft and said means secured to said shaft so that suspended particles are removed from the gas and moved in the direction of the field of gravity.

2. Apparatus according to claim 1, characterized in that said means forming the treatment chambers comprises radially extending partition walls defining in part individual treatment chambers, and said partition walls are inclined or curved forwardly in the direction of rotation of said shaft.

3. Apparatus according to claim 2, characterized in that entrainment vanes are positioned at the outer periphery of the treatment chambers, said curved wall of said housing has a spiral configuration providing said housing with a spiral shaped periphery, said inlet is arranged tangentially to said curved wall, and nozzles are provided at said inlet for the injection of additional liquid into said gas entering said housing.

4. Apparatus according to claim 2, characterized in that cylindrical concentric perforated members are provided at the outer periphery of the rotating treatment chambers.

5. Apparatus according to claim 3, characterized in that the direction of rotation of the treatment chambers (2) is opposed to the direction of the gases which enter tangentially at high speed into said spiral housing.

6. Apparatus according to claim 2, characterized by spray nozzles (14) located in the treatment chambers (2) and rotating therewith.

7. Apparatus according to claim 2, characterized in that short vanes are positioned within the treatment chambers and are located adjacent the central gas outlet, said short vanes have a length from 10 to 40 percent of the length of said radial partition walls, and at least one stationary nozzle is arranged in the central gas outlet for injecting liquid.

8. Apparatus according to claim 7, characterized in that the short vanes (17) at the central gas outlet (8) for liquid distribution are of a length in the radial direction of about 10 to 60 mm, and the distance between adjacent vanes is equal to or less than their length.

9. Apparatus according to claim 7, characterized in that the short vanes (17) for liquid distribution are displaced outwardly, relative to the diameter of the gas outlet, by from 10 to 50 mm.

10. Apparatus according to claim 7, characterized in that additional short vanes (12) of which the length is from about 10 to 40 percent of the length of the radial partition walls (4) are provided at the outer periphery of the treatment chambers (2).

11. Apparatus according to claim 10, characterized in that the short vanes (12) at the outer periphery of the treatment chambers are of a length in the radial direction of about 10 to 60 mm, and that the distance between adjacent vanes is equal to or less than their length.

12. Apparatus according to claim 7, characterized in that the radial partition walls (4) are of a length of from about 30 to 60 percent of the radial dimension of the chambers, so that they extend from the outer periphery of the treatment chambers (2) only into the middle portion thereof.

13. Apparatus according to claim 1, characterized in that said means forming the treatment chamber includes a pair of spaced disc-like boundary walls located within said housing and disposed perpendicularly to the axis of said shaft, and a plurality of inner short vanes located adjacent said central outlet, and a plurality of outer short vanes located adjacent the circumferential periphery of said boundary walls.

14. Apparatus according to claim 13, characterized in that the inner and outer short vanes (17, 12) are arranged displaced relative to each other.

15. Apparatus according to claim 7, characterized in that the treatment chambers (2) are filled with nets or mats made of wires or cords of less than 3 mm thick.

16. Apparatus according to claim 1, characterized in that said means forming the treatment chamber consists of a pair of spaced disc-like boundary walls located within said housing and a plurality of outer short vanes located adjacent the circumferential periphery of said boundary walls, said boundary walls and said outer short vanes arranged to accelerate the gases to the peripheral speed of the treatment chambers, and liquid distributor devices positioned within the central gas outlet.

17. Apparatus according to claim 1, characterized in that said means forming the treatment chambers comprises a disc-like boundary wall located within said housing on the opposite side thereof from said central outlet, said boundary wall being disposed perpendicularly to the axis of said shaft, concentric rings disposed in parallel relationship with and spaced from said boundary wall and located adjacent said gas outlet, a plurality of inner short vanes located adjacent to said central outlet and extending between said boundary wall and one of said concentric rings, and a plurality of outer short vanes located adjacent the circumferential periphery of said boundary wall and extending between said boundary wall and one of said concentric rings.

18. Apparatus according to claim 17, characterized in that nozzles are located within said treatment chambers, a rotating liquid fan wheel is arranged at the end of said shaft, and said fan wheel is connected to said nozzles which also rotate with the treatment chambers.

19. Apparatus according to claim 18, characterized in that a liquid cyclone centrifuge (20) is connected directly to the central gas outlet (8).

* * * * *